United States Patent [19]

Lewis

[11] 4,075,633
[45] Feb. 21, 1978

[54] SPACE ADAPTIVE COHERENT SIDELOBE CANCELLER

[75] Inventor: Bernard L. Lewis, Oxon Hill, Md.

[73] Assignee: The United States of America as represented by the Secretary of the Navy, Washington, D.C.

[21] Appl. No.: 519,469

[22] Filed: Oct. 25, 1974

[51] Int. Cl.² .............................................. G01S 3/06
[52] U.S. Cl. ............................ 343/100 LE; 325/371; 343/18 E
[58] Field of Search ...................... 343/100 LE, 18 E; 325/371

[56] References Cited

U.S. PATENT DOCUMENTS 3,202,990  8/1965  Howells .................. 343/100 LE
3,412,405  11/1968  Crotty et al. ............. 343/100 LE Primary Examiner—Howard A. Birmiel
Assistant Examiner—Richard E. Berger Attorney, Agent, or Firm—R. S. Sciascia; Philip Schneider; George A. Montanye

[57] ABSTRACT

An improved interference cancelling system and technique for optimizing signal sampling, particularly in a side-lobe canceller system operating in a multiple signal environment. A plurality of auxiliary antennas provide samples of the interference environment for cancelling interference received by a main radar antenna. At least one of the auxiliary antennas is rotated in a circle in a horizontal plane for causing modulation of the interference residue. The component modulated with the frequency of rotation in the residue is compared in phase with the rotation modulation frequency to derive a signal for automatically moving the antenna to a position in the horizontal plane where the residue modulation is substantially eliminated. At that position the cancellation is maximized for the particular geometry of interference sources at that time.

7 Claims, 2 Drawing Figures

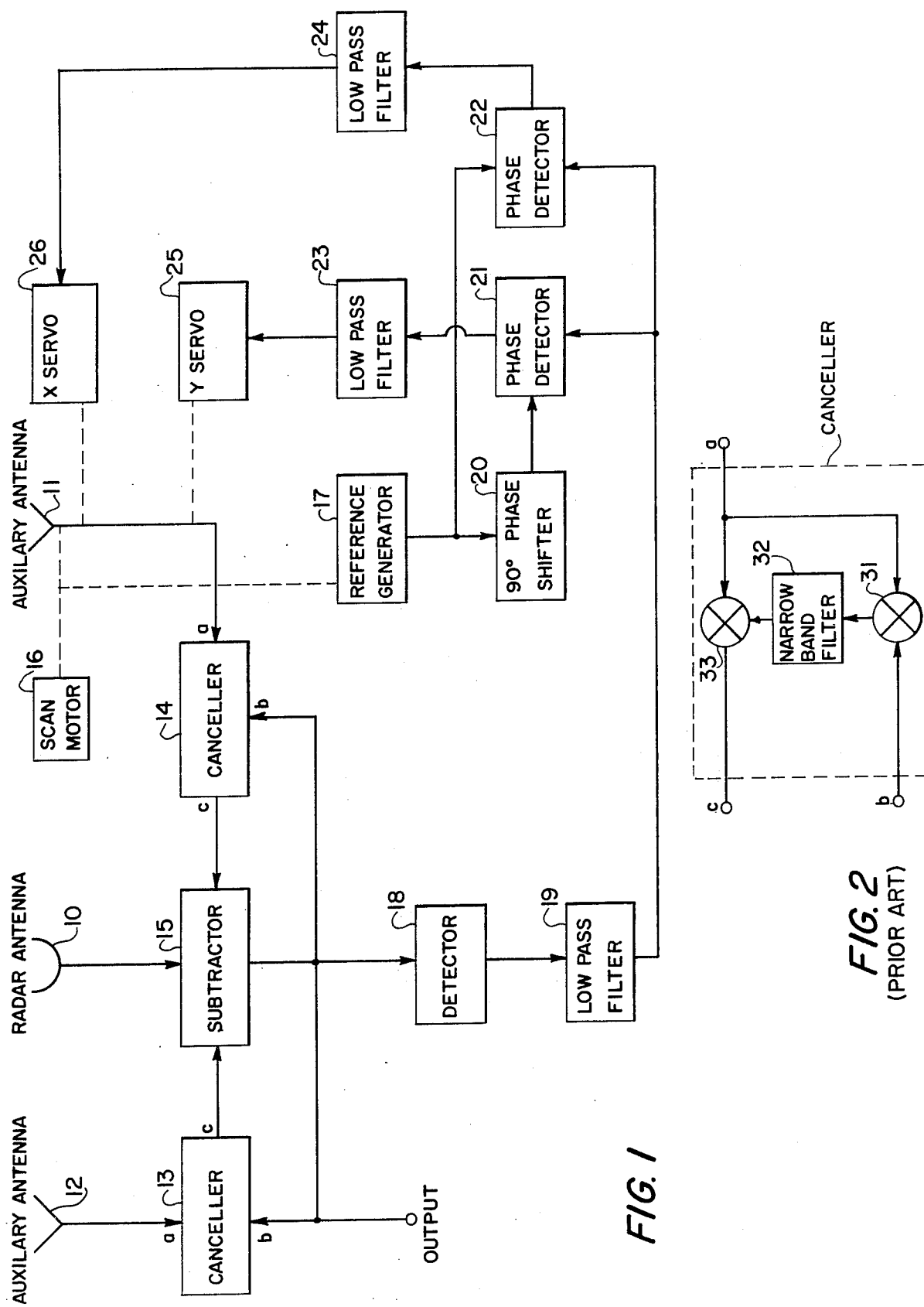

SPACE ADAPTIVE COHERENT SIDELOBE CANCELLER

BACKGROUND OF THE INVENTION

The present invention relates to improvements in interference suppression systems and more particularly to side-lobe cancellers operating in a multiple signal environment.

Generally, interference suppression systems are designed to reduce the presence of undesired signals in a signal receiving system. As is known, in particular systems, such as radar systems, the characteristics of the receiving antenna are such that undesired signals which are received in the side-lobes interfere with the isolation of the target signal received in the main lobe. Accordingly, to isolate the main lobe signals, side-lobe cancellers have been used to cancel interference from the side-lobe of the main radar antenna as exampled by U.S. Pat. No. 3,202,990 to Paul W. Howells.

Conventionally, receiving systems employing side-lobe cancellers have used auxiliary receiving channels to sample the environment in which a desired signal may be present. Each auxiliary signal forms an input which is used by the canceller system in an attempt to eliminate undesired (interference) signals which may be present in conjunction with the desired signals is a main channel. In U.S. Pat. No. 3,202,990 each canceller loop attempts to decorrelate the main channel signal from its auxiliary input signal by first phase shifting and amplitude weighting the auxiliary input and then subtracting this modified signal from the main channel to reduce interference.

Such systems as described above work well to eliminate main channel interference with a single canceller loop when only one interference source is present. However, when multiple interference sources are involved, conventional systems have been ineffective in reducing interference even though multiple canceller loops have been used. In theory, if N independent interference sources are present forming a signal environment, the interference signals may be cancelled from the desired signal by multiple canceller loops fed by inputs from N separate auxiliary channels. In practice, however, it has been found that effective cancellation is limited by the relative independence of the auxiliary inputs and by the configuration of the auxiliary antennas relative to the main antenna.

While prior known techniques have in some cases been successful in improving cancellation by making the auxiliary inputs relatively independent of one another, the same have required additional structures which render the system more complex. Other techniques have used many auxiliary channels and canceller loops to provide more samples of the interference environment but still exhibit ineffective cancellation even where the number of auxiliary channels exceeds the number of interference sources. As a result, present systems employing a fixed configuration of auxiliary receiving channels fail to provide adequate protection against sophisticated multiple interference countermeasure techniques.

Accordingly, the present invention has been developed to overcome the specific shortcomings of the above known and similar techniques and to provide a canceller system of improved performance and versatility in a multiple signal environment.

SUMMARY OF THE INVENTION

It is therefore an object of the present invention to provide an improved interference suppression system which is simple to implement yet highly reliable in operation.

Another object of the invention is to provide a canceller system that uses fewer auxiliary channels and canceller loops while still providing more effective cancellation.

A further object of the invention is to provide a side-lobe canceller system which provides an optimum geometry of interference sources.

Still another object of the invention is to provide a canceller system which automatically positions the auxiliary channel sensors relative to the main channel sensors for optimum cancellation.

Yet another object of the invention is to provide a coherent side-lobe canceller system that is easily expandable to accommodate any number of auxiliary receiving channel sensors in a multiple interference source environment.

In order to accomplish the above and other objects, the invention provides an interference suppression system, with movable auxiliary channel sensors, for providing improved interference cancellation for any configuration of multiple interference sources. In the present invention, each of a plurality of auxiliary receiving channel sensors are connected to receive signals from an equal number of signal sources forming the interference environment in which a main receiving channel sensor is attempting to operate. Each of the auxiliary receiving channel sensors are also connected to provide an input to canceller loops for developing a cancelling signal and reducing interference in the main receiving channel. In order to maximize cancellation for any given interference source geometry, a system is provided for moving the auxiliary channel sensors such that the configuration of the canceller system may be changed in response to interference source geometry. In a side-lobe canceller system, at least one of the auxiliary antennas is controlled such that direction to the position of maximum cancellation for the auxiliary antenna can be determined. The auxiliary antenna is then moved relative to the main antenna to the point where maximum cancellation is obtained. At that point, the canceller system configuration is such as to provide the most efficient cancellation for the interference source geometry. By making one or more antennas movable, the canceller system prevents inefficient cancellation so common in prior art systems using fixed system geometries. In addition, the more effective cancellation is automatically obtained with less elements since substantially complete cancellation can be obtained when the number of auxiliary channel sensors equals the number of signal sources (jammers) forming the interference environment for any given number of interference sources.

Other objects, advantages, and novel features of the invention will become apparent from the following detailed description of the invention when considered with the accompanying drawings wherein:

BRIEF DESCRIPTION OF THE DRAWINGS

FIG. 1 is a schematic diagram showing a preferred embodiment of the interference suppression system according to the present invention.

FIG. 2 is a schematic diagram showing the elements constituting one form of conventional adaptive canceller loop.

DETAILED DESCRIPTION OF A PREFERRED EMBODIMENT

Referring now to FIG. 1, a schematic diagram shows a preferred embodiment of the interference suppression system according to the present invention. In the present example, the invention will be described with reference to a radar system although the inventive teachings are equally applicable to other types of signal processing systems. Generally the system includes a main receiving channel sensor in the form of a directional radar antenna 10, and a plurality of independent auxiliary receiving channel sensors in the form of omnidirectional antennas 11 and 12 distributed in space about the main receiving antenna 10. While the system being described only refers to the main antenna as a receiving antenna, the antenna could just as well be modified in a conventional manner to both transmit and receive. The main radar antenna 10 forms the main channel input for receiving radar signals and any interference that may be present from the side-lobes. Auxiliary antennas 11 and 12 receive primarily interference and form the independent receiving channel inputs that provide samples of the interference environment in which the radar is attempting to operate. While only two auxiliary antennas are shown, it is within the scope of the invention to provide as many auxiliary antennas as needed, with the number being at least equal to the number of interference sources present during operation. For simplicity, the radar and auxiliary receivers have been omitted in the drawing since they are unnecessary to the understanding of the inventive principle, it being obvious that such receivers are incorporated to receive and process the antenna signals in a manner well known in the art.

The signals at antenna 10, after passing through the radar receiver (not shown), are coupled as input to the subtractor 15. In a like manner, the signals at antennas 11 and 12, after passing through their auxiliary receivers (not shown), are coupled to their associated cancellers 14 and 13 at inputs $a$ as shown in the drawing. The output from the subtractor 15 provides the main channel radar output and is additionally coupled back to inputs $b$ of cancellers 13 and 14. Cancellers 13 and 14 can be conventional construction as will be subsequently described with reference to FIG. 2, and are designed to develop an interference cancelling signal at output $c$. To complete the canceller loop, output $c$ is in turn coupled as input to subtractor 15 where it is subtracted from the main channel input at 10 to reduce interference in the main channel output from 15 as is well known.

According to the present invention, however, the output from subtractor 15, in addition to providing the main channel radar output, is coupled as input to a detector 18 which can be a diode or any other conventional envelope or square law detector. By way of example, if the canceller system uses an intermediate frequency (IF) side-lobe canceller as taught by U.S. Pat. No. 3,202,990, the detector acts to demodulate the IF signal. The output from the detector 18 is then coupled to a low pass filter 19 which acts to filter any IF frequencies and harmonics and pass only a modulating signal carried by the main channel interference residue output at 15 and detected by the detector 18. This filtered signal is then delivered as one input to each of two phase detectors 21 and 22. Phase detectors 21 and 22 are also of conventional construction and generally provide an output representative of the difference in phase between the two inputs.

Antenna 11, in addition to being coupled to provide input to canceller 14 at $a$ is mechanically coupled to a scan motor 16 as schematically indicated by the dotted lines. Scan motor 16 can be any conventional motor coupled to rotate the antenna 11 in such manner that the phase center of antenna 11 circumscribes a circle lying in a horizontal plane. Scan motor 16 rotates the antenna at a frequency $\omega_m$ and at the same time is additionally coupled to mechanically drive a reference generator 17 also as schematically shown by the dotted lines. Generator 17 is also of conventional construction and provides an AC reference waveform (such as a constant amplitude sine wave) at the same $\omega_m$ as the frequency of rotation of the antenna 11. The output from generator 17 is then coupled as the second input to phase detector 22, and through a 90° phase shifter before being coupled as the second input to phase detector 21. As previously stated, phase detectors 21 and 22 are conventional phase detector circuits and provide a signal indicative of the difference between the phase of the reference generator signal and the phase of the modulating signal from filter 18. The outputs from phase detectors 21 and 22 are passed through low pass filters 23 and 24 which filter out any modulating signal frequencies and harmonics and provide a DC voltage whose polarity and magnitude are determined by the phase difference of the input signals to each of the detectors 21 and 22. The output from filters 24 and 23 are then coupled to X and Y servo systems, respectively, which are in turn coupled to mechanically drive antenna 11 as represented schematically by the dotted lines. The X servo system drives the antenna along a first linear path in a horizontal plane and the Y servo system drives the antenna in a second linear path orthogonal to the first path in the same horizontal plane. The servo systems X and Y are connected in a conventional manner to be driven simultaneously in response to outputs of the phase detectors through filters 23 and 24 whose magnitude and polarity determine the speed and direction at which the servos are driven.

Turning now to FIG. 2, a common adaptive canceller is shown as an example of a canceller that might be used in the present invention. The construction and operation of such a canceller is well known as taught by the Howells U.S. Pat. No. 3,202,990, reference to which is hereby made, and will therefore not be discussed in great detail. Generally, however, the canceller is constructed to have inputs $a$ and $b$ and output $c$ which correspond to those inputs and outputs of the cancellers of FIG. 1. The inputs from $a$ and $b$ are coupled to a mixer 31 whose output is in turn coupled through narrow band filter 32 to mixer 33. The output from 32 is combined with the input from $a$ in mixer 33 to form the output $c$ of the canceller. As can be seen from FIG. 1, the output from subtractor 15 generally forms the input $b$ to the canceller while the signal from the auxiliary antenna forms the input at $a$. The output from $c$ is then coupled to complete the canceller loop through subtractor 15. As is well known, the mixer 31 and narrow band filter 32 form a correlator which produces a weighting function designed to equalize the phase and amplitude of the signal input at $a$ in mixer 33, to decorrelate the signal out of subtractor 15. As is also known, since the speed of response of the canceller loop is proportional to loop gain, and since loop gain is proportional to average power input, the loop will tend to cancel signals such as interference signals having high average power, while being relatively insensitive to signals such as radar returns. While the particular canceller of FIG. 2 has been referred to by way of example in forming the canceller loop, it should be realized that any well known canceller, designed to form an adaptive canceller loop for decorrelating signals, could be used in its place. In the present example, it is also obvious that if the particularly illustrated adaptive canceller of FIG. 2 is used to form the canceller loop of an IF sidelobe canceller system in the present invention, the additionally required structure for filtering and offsetting of signal frequencies, as taught by U.S. Pat. No. 3,202,990, must also be provided.

The operation of the inventive system will now be described with reference to FIG. 1. When a plurality of signal sources (in this case, jammers or other interference sources) are present, the signal received by the radar antenna 10 includes a radar signal carrier modulated by the radar signal, and plurality of interference (jammer) carriers having the same frequency, but different amplitude and phase, modulated by the jammer waveform. Each of the auxiliary receiving antennas 11 and 12 sample the environment in which the radar is attempting to operate and provide primarily interference signals corresponding to those received by the main antenna except for a phase shift and gain difference due to the difference in path between the jammer and auxiliary antenna and the jammer and radar antenna. Cancellers 13 and 14 are coupled to receive the auxiliary signals at $a$ and provide an output $c$ to subtractor 15 thereby forming a canceller loop for decorrelating the output of 15 from the interference signals from auxiliary antennas 11 and 12.

Up to this point the canceller system described is of conventional construction and operates in the conventional manner to reduce interference in the main channel radar output from subtractor 15. The conventional systems, however, as previously noted, utilize auxiliary antennas having fixed positions relative to the main antenna. Even when the main and auxiliary antennas are moved, they are synchronously rotated such that the relative positions of the main and auxiliary antennas remain fixed in a set geometry. It has been found that depending on the geometry (positions) of a plurality of interference sources, the amount of cancellation provided by the canceller system, will vary depending on the positions of the auxiliary antennas (geometry) relative to the main radar antenna. The result is that a fixed geometry antenna arrangement in a canceller system may not always provide optimum cancellation for the particular geometry of interference sources encountered, particularly where the canceller system geometry is fixed and the geometry of the interference sources is changing with time.

According to the present invention, therefore, a system is constructed which automatically moves one or more of the auxiliary antennas toward a position of increased cancellation where maximum cancellation is obtained. As shown in FIG. 1, antenna 11 is rotated by scan motor 16 such that the phase center of the auxiliary antenna circumscribes a small circle in the horizontal plane. The frequency of rotation $\omega_m$ may be, for example, 30 Hz, with the diameter of the circle of rotation about 1-2 feet. If the antenna position is such that maximum cancellation is not being obtained for the particular interference source geometry at that time, the circular rotation of the antenna will cause the antenna to move toward and away from the optimum position. This in turn will cause the interference residue out of the canceller loop to which the auxiliary antenna is coupled, to be modulated at the frequency of rotation $\omega_m$ of the auxiliary antenna phase center. The phase of the modulating signal with respect to the phase (representing position) of the moving antenna will be determined by the direction to the optimum position from the average position of the moving phase center. As previously described, scan motor 16 drives generator 17 to produce a reference signal whose phase represents the position of the antenna in a conventional manner. This signal, however, is converted into two signals one of which is delayed by 90° by phase shifter 20 before being coupled as the second input to phase detector 21, and the other of which is fed directly as the second input to phase detector 22. These two signals zero beat in the two phase detectors with the residue modulating signal $\omega_m$ from subtractor 15 after passing through detector 18 and filter 19. The outputs from the phase detectors, after passing through low pass filters 23 and 24 to remove $\omega_m$ and any harmonics, will be DC voltages whose polarity and magnitude will be dependent on the phase of the residue modulation from subtractor 15 which in turn is dependent on the direction to the position of optimum cancellation. The outputs from 24 and 23 are coupled to the X and Y servo system, respectively, which drive the antenna simultaneously along orthogonal paths in the horizontal plane in directions and speed as determined by the magnitude and polarity of the signals from 23 and 24. In response to these signals the X and Y servo systems drive the antenna to a position where the modulation in the interference residue out of subtractor 15 caused by phase center rotation is substantially eliminated. This position represents the position of optimum cancellation for the particular interference source geometry. In contrast to prior art systems, therefore, where the geometry of the auxiliary antennas are fixed relative to the main antenna, the present invention provides a system responsive to canceller loop output for sensing a condition of inadequate cancellation due to auxiliary antenna geometry, and then moves the antenna relative to the main antenna to a position of maximum cancellation for the interference source geometry.

As can be seen from the above description, the present invention provides many advantages over prior art systems. Using only conventional elements and simple mechanical and electrical connections, the geometry of the auxiliary receiving antennas relative to the main antenna can be automatically modified to produce more effective and reliable cancellation for a particular geometry of interference sources. This is particularly important in situations where multiple auxiliary antennas are employed against mutliple interference sources whose positions are changing with time. Using the present system the geometry of the auxiliary antennas would automatically move to provide maximum cancellation as the geometry of the interference sources changed. In addition, since conventional canceller systems can be easily modified to provide antenna movement and control, the inventive system can easily accomodate any number of auxiliary antennas as required for the particular interference environment. Further, since more effective cancellation can be provided by the movable system, the number of cancellers and auxiliary receiving channel sensors (antennas) can be reduced to N auxiliary antennas and cancellers against N interference sources and still provide adequate cancellation and a concurrent savings in cost and complexity of the system. It is additionally moted that since any number of auxiliary antennas can be made movable, the system is very versatile and adaptive to different situations and requirements that may be encountered. All of these are new features that are not found in conventional systems as previously mentioned.

While the invention has been described with particular reference to a radar system, it is clear that the present teachings are applicable to other canceller systems. Likewise, reference to particular parameters are only exemplary of many values that could be used depending upon the particular system requirements. In addition, while the cancellers 13 and 14 were parallel connected in the conventional manner to produce the main channel output at 15 to form the canceller loops, the canceller system could just as well utilize serial and parallel iterative systems as described in copending U.S. applications now Ser. Nos. 499,260, now U.S. Pat. No. 3,938,153 and 499,374, now U.S. Pat. No. 3,938,154 entitled "Improved Sidelobe Canceller System" to Bernard L. Lewis and Irwin D. Olin and "Modified Sidelobe Canceller System" to Bernard L. Lewis, filed in the U.S. Patent Office on Aug. 16, 1974 and assigned to the same assignee of the present application, to provide the main channel output signal. In a like manner, the signal processing system as disclosed in copending U.S. application Ser. No. 499,357 entitled "Adaptive Sidelobe Canceller System" to Bernard L. Lewis, filed in the U.S. Patent Office on Aug. 16, 1974 and application 508,774 entitled "Sampled Data Processing" to James P. Hansen, filed in the U.S. Pat. Office on Sept. 23, 1974, both assigned to the same assignee of the present invention, could also be used to provide the main channel output signal. It is further noted that if multiple movable antennas are employed, different antenna phase center rotation frequencies can be used so that frequency resolution can be employed to isolate the modulating signals on the interference residue from the canceller loops to drive the respective servo systems. It is even further noted that the particular mechanical scan of the preferred embodiment could be replaced by electrical scan techniques allowing higher scan rates. Monopulse and sequential lobing techniques could also be used to determine the direction to the optimum position in lieu of circular scan although the same would require additional structure rendering the system slightly more complex.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the U.S. is:

1. An interference suppression system for cancelling interference from a multiple source environment comprising:
   a main channel sensor constructed to receive desired and interference signals;
   a plurality of auxiliary channel sensors spaced about said main channel sensor and constructed to receive primarily interference signals;
   canceller means coupled to said main and auxiliary channel sensors for cancelling interference from said main channel signals and providing a main channel output; and
   positioning means coupled to at least one of said auxiliary channel sensors and responsive to said main channel output for positioning said at least one auxiliary channel sensor relative to said main channel sensor such as to provide improved interference cancellation in said main channel output.

2. The system of claim 1 wherein said means for positioning includes; means coupled to said canceller means for detecting inteference from said main channel output, and means responsive to said detecting means for moving said at least one auxiliary channel sensor relative to said main channel sensor so as to reduce said interference.

3. The system of claim 2 wherein said main sensor is a directional radar antenna.

4. The system of claim 3 wherein said positioning means further includes means for scanning said at least one auxiliary channel sensor at a frequency $\omega_m$, and wherein said means for detecting is constructed to detect a modulating frequency on the interference from said main channel output, and further wherein said means for moving comprises; means for comparing the phase of the interference modulating frequency with the phase of the scanning frequency, and servo means coupled to said comparing means for moving said at least one auxiliary channel sensor in a horizontal plane in a direction to substantially eliminate said interference modulating frequency.

5. The system of claim 4 wherein said auxiliary sensors are omnidirectional antennas.

6. The system of claim 5 wherein said means for scanning is constructed to rotate said at least one auxiliary channel antenna such that the antenna phase center circumscribes a circle in a horizontal plane, and wherein said servo means is constructed to move said at least one auxiliary antenna along orthogonal paths in said horizontal plane.

7. The system of claim 6 wherein the number of auxiliary antennas is equal to the number of interference sources forming the interference environment.

* * * * *